July 7, 1936.   T. A. DICKSON   2,046,613
BEARING FOR ROTARY MACHINE ELEMENTS
Filed Sept. 15, 1934   3 Sheets—Sheet 1
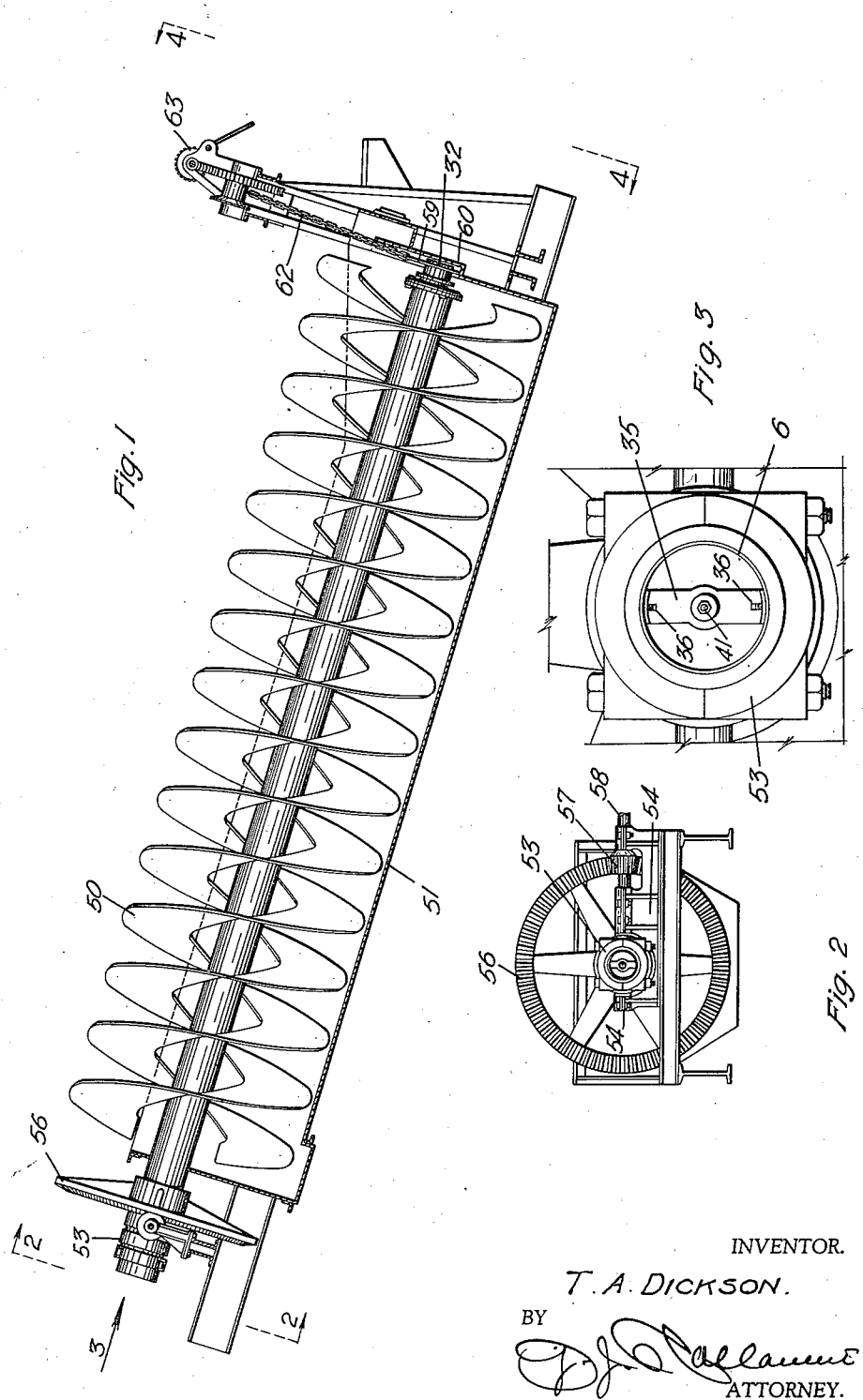
INVENTOR.
T. A. DICKSON.
BY
ATTORNEY.

July 7, 1936. T. A. DICKSON 2,046,613
BEARING FOR ROTARY MACHINE ELEMENTS
Filed Sept. 15, 1934 3 Sheets-Sheet 2
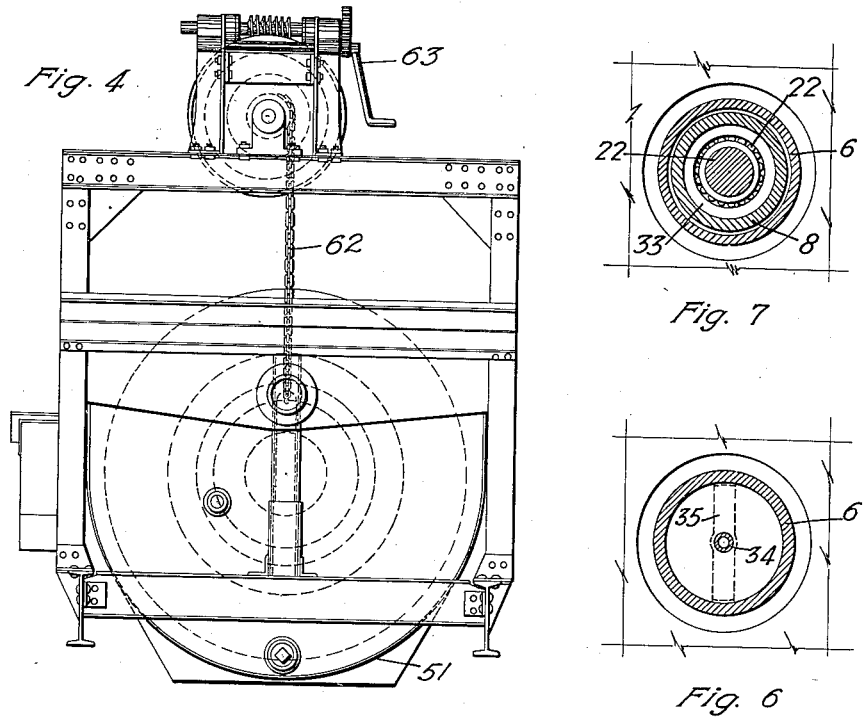
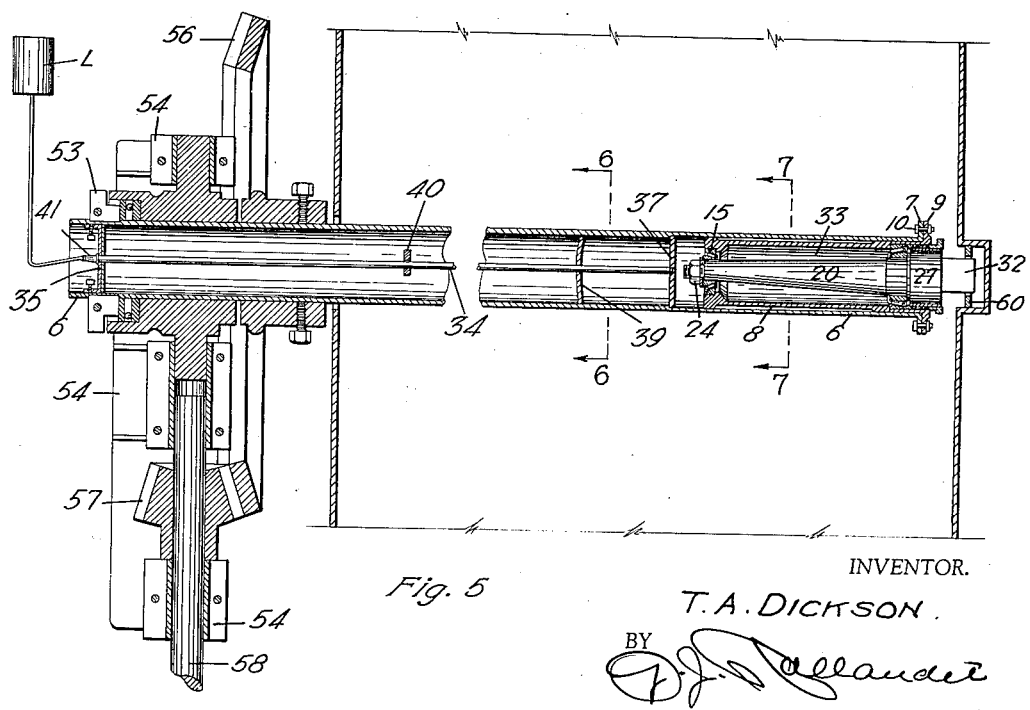
INVENTOR.
T. A. DICKSON.
BY
ATTORNEY.

July 7, 1936.    T. A. DICKSON    2,046,613
BEARING FOR ROTARY MACHINE ELEMENTS
Filed Sept. 15, 1934    3 Sheets-Sheet 3
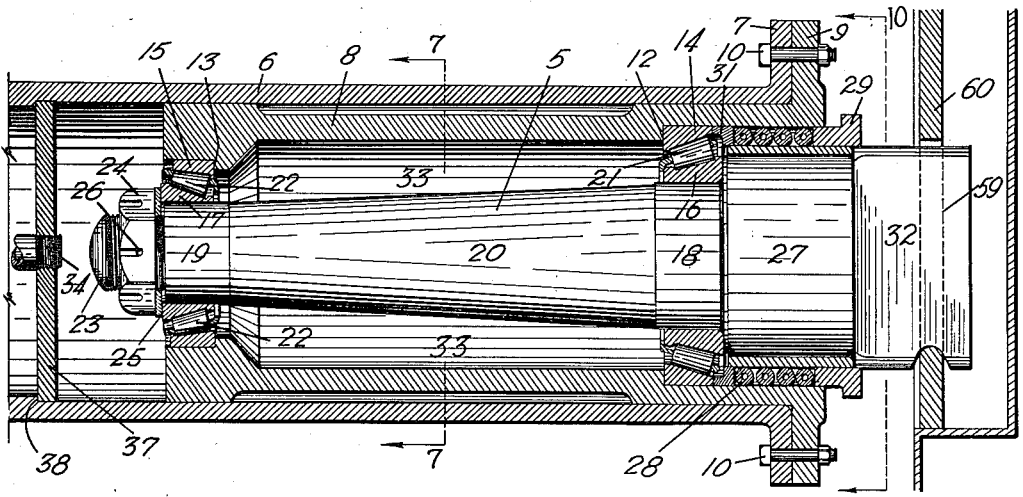
Fig. 8
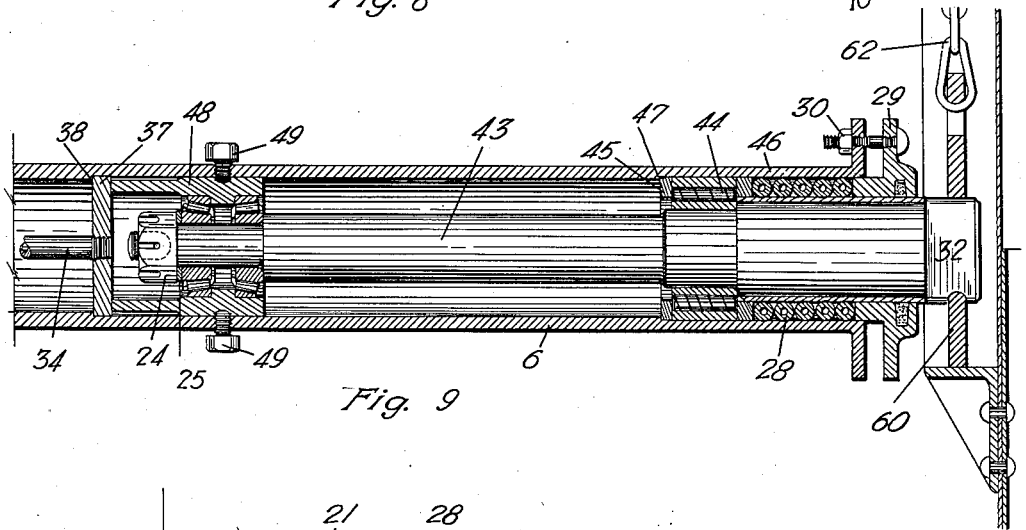
Fig. 9
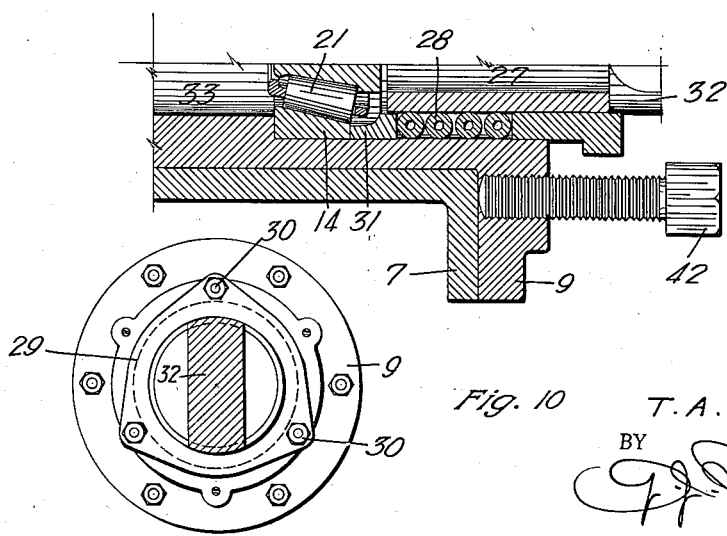
Fig. 10    Fig. 11
INVENTOR.
T. A. DICKSON
BY
ATTORNEY.

Patented July 7, 1936

2,046,613

UNITED STATES PATENT OFFICE 2,046,613

BEARING FOR ROTARY MACHINE-ELEMENTS

Thomas A. Dickson, Denver, Colo.

Application September 15, 1934, Serial No. 744,217

6 Claims. (Cl. 308—187)

This invention relates to bearings for rotary machine-elements and more particularly to bearings for the support of rotary elements which in the operation of the machine of which they are a part, are partially or completely submerged in a liquid or semi-liquid body of material under treatment.

While the bearing of the present invention may be effectively employed in other connections, it is particularly adapted for use in supporting the submerged free end of the conveyor-shaft of an ore-classifier of the type disclosed in my Letters Patent No. 1,785,302, issued December 16, 1930, and it is in this connection that the invention has been illustrated in the accompanying drawings.

It is an object of the invention to provide a bearing of the above described character, in which simplicity of construction is combined with practicability and efficiency in operation. In comparison with other similar bearings used heretofore, and more particularly with the bearing shown and described in the above-mentioned patent, the present bearing has many advantages, and further objects of the invention reside in providing a bearing for a submerged rotary element which will effectively prevent the admission of grit and muck to the operating parts thereof, and which will constantly maintain its proper position relative to the element under all conditions as, for example, when the latter is lifted as in the operation of the classifier hereinbefore referred to.

Other objects of the invention are to provide a bearing of the above stated character which may be packed with grease or other lubricant without the possibility of producing a hydraulic action by which the parts supported by the bearing may be displaced or by which the driving gear of such parts may be subjected to detrimental and injurious strains, and still further objects are to be found in details of construction and novel and advantageous arrangements and combinations of parts as will be fully disclosed in the following description.

In the drawings in the several views of which like parts are similarly designated, Figure 1 represents a sectional elevation of a classifier of the type mentioned hereinbefore, to which a bearing according to the present invention has been applied in a preferred embodiment thereof, Figure 2 is an end-view of the classifier looking in the direction of the arrows 2 in Figure 1, Figure 3 is an enlarged end-view of the conveyor-shaft of the classifier looking in the direction of the arrow 3 in Figure 1, Figure 4 is an elevation of the classifier at the opposite end of the same looking in the direction of the arrows 4 of Figure 1, Figure 5 is a fragmentary longitudinal section of the conveyor-shaft, showing its operative relation to the driving gear and to the bearing of the present invention, Figure 6 is an enlarged transverse section taken on the line 6—6 of Figure 5, Figure 7 is a similar section along the line 7—7 of Figure 5, Figure 8 represents an enlarged sectional elevation of a bearing embodying the present invention in its preferred form, Figure 9 is a similar view drawn to a reduced scale, showing a modification of the bearing of Figure 8, Figure 10 is a section along the line 10—10 of Figure 8, and Figure 11 is a fragmentary sectional view of parts of the bearing of Figure 8, illustrating a method of taking the same apart for renewal or repair.

Referring first to Figure 8 of the drawings, the bearing shown therein, comprises a spindle 5 constituting the stationary member of the bearing, which carries the rotary element of the classifier or other machine to which the bearing is applied.

This rotary element has been shown in the form of a hollow shaft 6 flanged at its open end, as at 7, and carrying a bushing 8 which functions as a carrier for the thrust bearings by which the shaft is supported upon the spindle.

This bearing-carrier is driven into the hollow shaft to fit snugly within the end-portion thereof and it has an end-flange 9 corresponding with the flange of the shaft, to which it is rigidly connected by machine bolts 10.

The bearing-carrier is recessed at its opposed ends thereby providing shoulders 12 and 13 which determine the position inside the respective recesses, of the outer races 14 and 15 of two anti-friction bearings. In the construction shown in Figure 8, the two bearings are of the so-called "Timken" or roller type and their inner races 16 and 17 are driven onto cylindrical portions 18 and 19 of the spindle at opposite sides of the conical body portion 20 of the same. The two roller bearings are of different sizes the smaller one being at the free end of the spindle and the larger one being adjacent the end of the same at which it is supported, in a manner hereinafter to be described.

The rollers 21 and 22 of the two bearings slant axially from the respective ends of the spindle inwardly, and it is a distinctive feature of the invention that the bearings function as thrust elements acting in opposed directions to cooperatively prevent longitudinal displacement of the spindle within or relative to the rotary element which it supports.

The spindle and the rotary shaft are thus constantly maintained in true axial coincidence, any oscillatory or wabbling movement of the spindle is eliminated and any "pumping" action which in other bearings of similar character used heretofore, would tend to produce the hydraulic effect hereinbefore referred to is effectively prevented.

The spindle terminates at its free or inner end in a screw-threaded stud 23 for the application of an adjusting nut 24 which through the medium of a washer 25 bears upon the inner race of the adjacent small roller bearing thereby locking the parts in their proper relative positions. A cotter pin 26 holds the nut in its adjusted position.

At the opposite, free end of the spindle adjacent the part which carries the inner end of the larger roller bearing, is a cylindrical extension 27 of relatively larger diameter which provides within the corresponding recess of the bearing-carrier, an annular space for the application of a packing 28 and a gland 29 of a stuffing box which prevents the passage of liquid to and from the bearings through the end of the carrier. The gland is flanged and is adjustably held in place against the packing by nuts 30 screwed onto studs which project from lugs or flanges at the end of the carriers through holes in the flange of the gland.

The packing may be of hollow core coil type and it engages at its inner end upon a retainer ring 31 which presses against the outer race of the adjacent large roller-bearing. A wear-sleeve 32 driven upon the cylindrical portion 27 of the spindle, is renewable in case of wear.

It will be noted that in the construction as shown and described, the large roller bearing carries the main load of the rotary element in addition to taking any thrust on the spindle from the outside inwardly while the smaller roller bearing takes any thrust in the opposite direction while supporting the inner end of the spindle in a truly central fixed position.

In practise, grease or other lubricant is fed to the bearings from a source of lubricant under pressure, indicated at L in Figure 5, through the medium of a pipe 34 which extends inside the hollow shaft in axial coincidence therewith. The pipe 34 is supported inside the shaft by an angle-brace 35 which is secured at the outer end of the shaft by set-screws 36; by a comparatively heavy disk 37 which engages a shoulder 38 inside the shaft adjacent the relatively stationary bearing, by one or more flexible braces 39 frictionally engaging the interior surface of the shaft at intermediate points, and, if necessary by other braces such as that shown at 40. The pipe carries at its outer end a nipple 41 for its connection with a conveniently located source of grease-supply under pressure. The pipe is applied to the shaft by driving it from the inner end of the same outwardly until the disk 37 engages the shoulder 38.

Each flexible brace 39 is of slightly larger diameter than the interior of the pipe, so that it is compelled to flex while the pipe is driven inwardly, to insure its fixed central position with relation to the pipe after the disk 37 is driven home against the shoulder 38 of the pipe.

When the pipe is in place, the disk 37 is spaced from the end of the stationary bearing to give the lubricant the opportunity of passing under pressure through the smaller roller bearing into the grease chamber 33 and thence through the larger bearing to the stuffing box the gland of which is loosely fitted in the end of the bearing-carrier so as to permit the escape of a small portion of the lubricant, thereby lubricating the packing as well as the thrust bearings and creating a slight circulation of the lubricant from the inside outwardly.

The disk 37 provides a hydraulically tight closure for the hollow shaft, at a suitable distance from its bearing and together with the stuffing box at the outer end of the shaft, provides a chamber including the space between the disk and the bearing-element, the space 33 around the spindle and between the two roller-bearings, the roller-bearings and the space occupied by the packing, which is constantly filled with lubricant under pressure, supplied through the pipe 34. In this connection, it is to be understood that while the pipe 34 is a convenient and practical means of feeding the lubricant to the chamber, the lubricant may be fed to the chamber at another point, in which case the disk 37 is made imperforate so as to provide a grease-tight closure of the shaft at the point at which it is applied.

Owing to the arrangement of the parts as described, the position of the bearing inside the shaft cannot be changed irrespective of the pressure applied through the lubricant.

The packing gland of the stuffing box is of comparatively small diameter, and is readily accessible for adjustment.

In Figure 11 is shown a convenient method of removing the bearing carrier with the parts supported therein for renewal or repair.

After the bolts 10 which connect the flanges of the bearing-carrier with that of the tubular shaft, have been removed, a number of large set screws 42 are screwed into threaded openings in the outer end of the carrier to bear upon the corresponding end of the shaft. Continued inward movement of the set screws, will cause outward movement of the carrier, thereby facilitating its subsequent complete removal.

Figure 9 of the drawings shows a modification of the assemblage illustrated in Figure 8 and hereinabove described.

In this modified construction, the bearing carrier comprises a bushing 48 which carries the small thrust bearing only which abuts against the disk 37 and which is held in fixed relation to the shaft by means of cap-screws 49.

The outer races of the smaller thrust bearing abut against shoulders at the inside of the carrier 48 and the inner races of the same engage with a shoulder of the spindle and with the washer 25, respectively.

The body portion 43 of the spindle is in this instance cylindrical in form, and the large roller bearing 44 is of the well-known "Hyatt" type and disposed between two retainer rings 45 and 46 one of which engages an interior shoulder 47 of the shaft while the other is engaged by the packing of the stuffing box. Otherwise, the modified construction is in the form and arrangement of its constituent parts, similar to the preferred form of the invention shown in Figure 8.

The manner of supporting the spindle of the bearing must obviously be varied in accordance with the character of the machine of which the rotary element supported by the bearing, is a part.

In the construction illustrated in the drawings the rotary element is the conveyor shaft of a classifier of the type disclosed in the patent referred to in the introductory part of this description.

The conveyor comprises a spiral blade 50 carried by the tubular shaft 6 and partially submerged in a slanting position in a classifier tank or trough 51.

The tank has at its lower end, an overflow weir 52 which determines the liquid-level of material under treatment. The upper end of the shaft which is above the liquid-level, projects through an opening in the end wall of the tank and is journaled in a swivel bearing 53 provided with trunnions which rest in boxes 54 on the supporting structure 55 of the machine. A bevel gear wheel 56 on the conveyor shaft, is driven by a pinion 57 on a shaft 58 axially alined with the trunnions and connected with a conveniently located motor or other source of driving power.

It is apparent that by this arrangement, the conveyor may be tilted about the axis of its trunnions without disturbance of the cooperative position of the gears. In the operation of the classifier it is desirable to raise the lower or submerged end of the conveyor, and to again lower the same to its operative position, for the main purpose of affording access to matter congregated in the bottom of the tank, and in the present construction this movement of the conveyor is effected thru the medium of the spindle 5 which is the major element of the bearing which supports the submerged end of the conveyor shaft. The spindle is, to this end provided with a flattened shank 59 which projects beyond the stuffing box and which is supported in a stirrup or hanger 60 of corresponding cross sectional form. The stirrup is fitted for upward and downward movement in a stationary guide way 61 and it is suspended by means of a chain 62 or the like from a hoisting device mounted upon the supporting structure of the classifier. The hoisting device may be a manually operated winze as shown at 63 in the drawings or it may be a hydraulic or power-driven jack if so desired, or any other suitable lifting device.

The spindle being thus mounted in a floating condition for upward and downward adjustment, is held against rotary displacement in the stirrup of the lifting device, and supports the rotary element of the classifier in the manner hereinabove described. The thrust bearings prevent longitudinal displacement of the conveyor-shaft relative to the bearing, and the rotary and relatively stationary elements are permanently held in their proper positions with relation to each other, irrespective of any strains to which they may be submitted either mechanically or through the pressure of the lubricant supplied to the bearing through the grease pipe.

As stated hereinbefore, the chamber mainly constituted by the space between the disk 37 and the bearing and by the space between the thrust bearings exteriorly of the spindle, is constantly filled with lubricant under pressure, while the stuffing box effectively retains the lubricant and prevents the passage of the liquid material in which the lower end of the shaft is submerged, from the outside inwardly.

In other words, any circulation of fluid must necessarily be from the inside of the shaft, outwardly of the same.

If applied to machines other than the classifier, as for example, the tail pulley of a bucket elevator, the spindle may be fixed at its outer extremity in a stationary support within the spirit of the invention.

Other modifications of the construction and arrangement of the essential parts of the bearing may be resorted to within the scope of the hereunto appended claims.

What I claim and desire to secure by Letters Patent is:

1. The combination with a hollow interiorly shouldered rotary shaft, of a spindle projecting into one end thereof, bearings supporting the shaft upon the spindle, there being a space between the bearings and around the spindle, to receive a lubricant, a stuffing box at the end of the shaft, an apertured disk fitted in the shaft against an interior shoulder thereof beyond the innermost end of the spindle, to provide in cooperation with the stuffing box, a lubricant chamber inclusive of the bearings and said space between the bearings and the spindle, and a lubricant supply pipe having one end positioned in the aperture in the disk and the other end accessibly positioned in the other end of the shaft.

2. The combination with a hollow interiorly shouldered rotary element, of a spindle projecting into an end thereof, bearings supporting the element upon the spindle, there being a space between the bearings and around the spindle, to receive a lubricant, a stuffing box at the end of the element, an apertured disk fitted in the element against an interior shoulder thereof beyond the innermost end of the spindle, to provide in cooperation with the stuffing box, a lubricant chamber inclusive of the bearings and said space between the bearings, a pipe in an aperture of the disk for the supply of lubricant to the chamber, and a brace cooperating with the disk to support the pipe inside the element.

3. The combination with a hollow interiorly shouldered rotary element, of a spindle projecting into an end thereof, bearings supporting the element upon the spindle, there being a space between the bearings and around the spindle, to receive a lubricant, a stuffing box at the end of the element, an apertured disk fitted in the element against an interior shoulder thereof beyond the innermost end of the spindle, to provide in cooperation with the stuffing box, a lubricant chamber inclusive of the bearings and said space between the bearings, a pipe in an aperture of the disk for the supply of lubricant to the chamber, and a flexed brace cooperating with the disk to support the pipe inside the element.

4. The combination with a hollow shaft mounted for rotation and provided in its inner surface with a shoulder positioned adjacent one end thereof, an apertured disk positioned against the shoulder, a lubricant supply pipe having one end positioned in the aperture in the disk, means for supporting the pipe with its outer end in substantially concentric relation with the other end of the shaft, a bearing located in the shaft between the disk and the adjacent end thereof, a spindle journaled in the bearing, and an oil seal between the end of the shaft and the spindle.

5. In a machine of the class described, having a downwardly ranging hollow shaft whose lower end is submerged in a liquid, a bearing and lubricating means associated with the lower end of the shaft, comprising a hollow bearing element positioned in the lower end of the shaft, means for securing the bearing to the shaft, a supporting spindle extending into the bearing, means for preventing longitudinal relative movement of the spindle and the bearing, an oil seal between the spindle and the shaft, an apertured disk positioned in the shaft a short distance from the inner end of the spindle, the disk and the oil seal forming a lubricant compartment, a pipe extending from the upper end of the shaft to the disk and having its lower end positioned in the aperture in the disk, and means for positioning the pipe within the shaft with its upper end in accessible position.

6. In a machine having a downwardly ranging hollow shaft whose lower end is submerged in a liquid, the lower end of the shaft having an outwardly extending flange, the inner surface of the shaft having a shoulder facing the flanged end, an apertured disk positioned against the shoulder, a tubular bearing removably positioned in the flanged end of the shaft, the bearing having an outwardly extending flange which overlaps the flange on the shaft, means for interconnecting the flanges, a spindle projecting into the bearing, means for holding the spindle from longitudinal movement in the bearing, means comprising a stuffing box for forming a seal between the shaft and the spindle, and a lubricant supply pipe extending through the hollow shaft and having its lower end positioned in the aperture in the disk.

THOMAS A. DICKSON.